United States Patent Office

3,558,698
Patented Jan. 26, 1971

3,558,698
PERFLUOROALKANESULFONAMIDES N-SUBSTITUTED BY A PLURALITY OF CARBOCYCLES
Joseph Kenneth Harrington, Edina, Donald C. Kvam, North Oaks, Arthur Mendel, Vadnais Heights, and Jerry E. Robertson, North Oaks, Minn., assignors to Minnesota Mining and Manufacturing Company, St. Paul, Minn., a corporation of Delaware
No Drawing. Continuation-in-part of application Ser. No. 588,338, Oct. 21, 1966. This application June 30, 1969, Ser. No. 837,899
Int. Cl. C07c *143/74;* A01n *9/16*
U.S. Cl. 260—556                5 Claims

ABSTRACT OF THE DISCLOSURE

N-substituted perfluoroalkanesulfonamides in which the sulfonamide nitrogen substituent is a group containing a plurality of carbocycles and selected from cycloalkanoylphenyl, naphthyl, anthroquinonyl, fluorenonyl and N-(naphthyl)carbamylphenyl. Also included are salts of these compounds, compositions containing the compounds and processes for their preparation and use. The compounds are active as herbicides and plant growth modifiers.

---

This application is a continuation-in-part of copending application Ser. No. 588,338, filed Oct. 21, 1966, and now abandoned.

The invention relates to perfluoroalkanesulfonamides N-substituted by groups containing a plurality of carbocycles. These compounds have activity as herbicides and plant growth modifiers.

Perfluoroalkanesulfonamides have been disclosed broadly heretofore (see, for example, U.S. Pats. 2,732,398 and 3,321,445) but there has been no indication of any herbicidal activity of such compounds.

In the N-substituted perfluoroalkanesulfonamides of the present invention, the sulfonamide nitrogen substituent is a group containing a plurality of carbocycles and selected from cycloalkanoylphenyl, naphthyl, anthraquinonyl, fluorenonyl and N-(naphthyl)carbamylphenyl. The invention also includes salts of the compounds, processes for their preparation, compositions containing them and methods for their use as herbicides, and plant growth modifiers.

It is an object of the invention to provide compounds which modify the growth of plants, i.e. compounds which prevent, alter, destroy or otherwise affect the growth of plants.

It is a further object of the invention to provide a method for controlling unwanted plants.

It is another object of the invention to provide herbicidal compositions containing one or more perfluoroalkanesulfonamides as active ingredients therein.

It is another object of the invention to provide compounds which are active anti-inflammatory agents.

Still other objects of the invention will be made apparent by the following specification.

DETAILED DESCRIPTION

According to the present invention, there is provided a class of compounds consisting of perfluoroalkanesulfonamides having the general formula:

$$R_fSO_2NHAr \qquad (I)$$

and metal, ammonium and organic amine salts thereof wherein $R_f$ is a straight or branched chain perfluoroalkyl group containing from one to four carbon atoms and Ar is selected from cycloalkanoylphenyl, naphthyl, anthraquinonyl, fluorenonyl and N-(naphthyl)carbamylphenyl.

In the metal, ammonium and organic amine salts, the sulfonamide hydrogen of the formula is replaced by a suitable cation.

The salts of the invention are prepared by treating the acid form (shown in the foregoing Formula I) with a stoichiometrically equivalent amount of an appropriate base under mild conditions. Among the metal salts of the invention are alkali metal (e.g. lithium, sodium and potassium), alkaline earth metal (e.g. barium, calcium and magnesium) and heavy metal (e.g. zinc and iron) salts as well as other metal salts such as aluminum. Appropriate bases for use in preparing the metal salts include metal oxides, hydroxides, carbonates, bicarbonates and alkoxides. Some salts are also prepared by cation exchange reactions. The organic amine salts include the salts of alkylamines and aromatic amines, primary, secondary or tertiary. These and the ammonium salts can be prepared by reacting the acid form with the appropriate organic base or ammonium hydroxide. The salts of the invention are frequently formed by reacting the precursors in aqueous solution. This solution can be evaporated to obtain the salt of the compound, usually as a dry powder. In some cases, it may be more convenient to use a non-aqueous solvent such as alcohols, acetone, etc. Since many of the salts are water soluble, they are often used in the form of aqueous solutions.

Due to the acidity of the hydrogen of the sulfonamido group of Formula I, the compounds of Formula I are catalysts for certain acid-catalyzed polymerizations, e.g. polymerization of epoxides. Many of the compounds of the invention are antimicrobial agents, according to standard test procedures. Also, some are anti-inflammatory agents when tested by standard test procedures using animals.

Preferably, $R_f$ in the compounds of the invention is trifluoromethyl. Price is an important consideration in herbicides and such compounds offer more economical utilization of fluorine together with high activity. Ar usually and preferably contains not more than about 20 carbon atoms and must be selected from the group defined hereinabove.

Preferred herbicidal compounds of the invention are: 2-cyclohexanoyltrifluoromethanesulfonanilide and 1-bromo-4-trifluoromethylsulfonamidonaphthalene.

In order to control unwanted plants, the compounds of the invention can be used alone as herbicides, for example, as dusts or granules of the compounds, or preferably they may be applied in formulations containing the active ingredients in a horticulturally acceptable extending medium. The formulations are comprised of one or more active ingredients and one or more herbicidal adjuvants and/or carriers. Specific formulations are useful to facilitate the application of the compounds and to achieve specific biological objectives such as controlling the availability of the herbicide, improving adherence to plants, and the like, as is well known to those skilled in the art.

The compounds of the invention may be formulated as wettable powders, emulsifiable concentrates, aqueous or non-aqueous solutions and/or suspensions, granules, dusts and the like. Said compounds as such can be finely divided and dispersed or suspended in any of the usual aqueous media, or if appropriate salts are used, a solution may be made. Spreading agents, wetting agents, sticking agents or other adjuvants can be added as desired.

The compounds or the above formulations are applied by spraying, spreading, dusting or the like. The rate of application will of course vary, but the more active compounds of the invention exhibit satisfactory control of broadleaf and grass weeds at the application rate of about 5 to 30 pounds per acre. It is, of course, to be expected that local conditions, for example, temperature, humidity, moisture content of the soil, nature of the soil, and the like, may require greater or smaller amounts. Effective resolution of these factors is within the skill of those versed in the herbicidal art. Likewise it is apparent that not all of the compounds included within the scope of the invention have equal activity.

The herbicidal compositions may contain one or more of the herbicidal compounds set out hereinbefore as the sole active species, or they may contain in addition thereto other biologically active substances. Thus insecticides and fungicides may be incorporated in the compositions. Further, if desired, the herbicidal compositions may contain fertilizers, trace metals or the like and when applied directly to the soil may additionally contain nematicides, soil conditioners, plant growth regulators and/or herbicides of similar or different properties.

The compounds of this invention are broadly active as herbicides. However, some of the compounds of this invention also show various types of plant growth modifying activity. Plant growth modification as defined herein consists of all deviations from natural development, for example, defoliation, stimulation, stunting, retardation, desiccation, tillering, dwarfing, regulation and the like. This plant growth modifying activity is generally observed as the compounds of the invention begin to interfere with certain processes within the plant. If these processes are essential, the plant will die if treated with a sufficient dose of the compound. However, the type of growth modifying activity observed varies among types of plants. It has been found that with certain compounds of the invention, herbicidal activity can be separated from certain other plant growth modifying activities by controlling the rate of application.

Broadly speaking, the compounds of this invention are readily prepared by one or all of the following methods, each of which is illustrated by an equation.

Method A

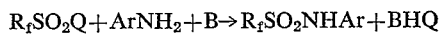
$R_fSO_2Q + ArNH_2 + B \rightarrow R_fSO_2NHAr + BHQ$ where Q is a halogen or perfluoroalkanesulfonate residue, B is an organic or inorganic base which acts as an acid acceptor and $R_f$ and Ar are as defined above.

A solution of the appropriate primary arylamine and an equimolar quantity of a suitable acid acceptor (such as triethylamine, dimethylaniline, pyridine and the like) in an inert organic solvent is ordinarily used. However, an acid acceptor is not always necessary, and an excess of the primary arylamine may also serve as acid acceptor. Among the suitable solvents are 1,2-dimethoxyethane, benzene, chloroform, dichloromethane, dimethylacetamide, dimethylformamide and the like. Alternatively, an excess of the primary arylamine or the acid acceptor may serve as a solvent, or the reaction may be carried out in the absence of solvent. Generally, an equimolar quantity of the appropriate perfluoroalkanesulfonic anhydride or halide is added to the solution. The addition is advantageously carried out at −15° C. to 100° C., and for some reactants higher or lower temperatures may be preferable. In cases where the amine is of lower reactivity, it is advantageous to allow the reaction mixture to remain at reflux temperature for a few hours following addition.

The reaction of Method A may also be carried out in a high pressure reactor. This technique is particularly preferred when perfluoroalkanesulfonyl fluorides are used as reactants. These reactions are usually carried out at temperature ranges of 0 to 150° C., but these temperature ranges may be raised or lowered, depending upon the reactants used. Such reactions are most frequently carried out without solvent, or with dimethylformamide or excess triethylamine as solvent, but other advantageous variations are possible.

It will be appreciated that the scope of this invention encompasses starting materials of a wide range of physical and chemical properties, and the synthetic Methods A, B and C discussed herein are described in general and preferred language. However, a great variation in the use of these synthetic techniques is possible, and this invention is broadly inclusive of such variations.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

Method B

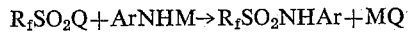
$R_fSO_2Q + ArNHM \rightarrow R_fSO_2NHAr + MQ$ where M is an alkali metal and Q, $R_f$ and Ar are as defined above.

An alkali metal salt of the appropriate amine is prepared by any of several conventional methods such as by reaction with sodium naphthalene, a metal hydride such as sodium hydride, alkoxides such as potassium t-butoxide in protic or aprotic solvents, or by reaction with an alkali metal such as sodium or potassium directly in an appropriate solvent.

The resulting salt is then treated with a perfluoroalkanesulfonyl alkylating agent such as trifluoromethanesulfonyl fluoride or chloride or trifluoromethanesulfonic anhydride, either at atmospheric pressure in open apparatus or under pressure in a pressure vessel. The reaction takes place at 0° to 150° C., depending on the reactivity of the amine and the sulfonyl halide. On completion of the reaction, the product is obtained by conventional work-up techniques as described in Method A.

Method C

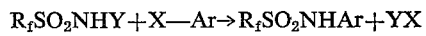
$R_fSO_2NHY + X—Ar \rightarrow R_fSO_2NHAr + YX$ $R_f$ and Ar are as defined above, X is halogen and Y is an alkaline earth or alkali metal. The perfluoroalkanesulfonamide salt and an appropriate aryl halide are reacted, generally in a suitable solvent (such as dimethylsulfoxide, dimethylformamide, 1,2 - dimethoxyethane, dimethylacetamide and the like). Heating or cooling, usually the former, may be advantageous to obtain a desirable rate of reaction.

After the completion of the reaction, the product is isolated by conventional methods. For example, when the reaction mixture is diluted with water the product may precipitate. Alternatively, the product may be extracted from the reaction mixture after dilution with water. Other recovery techniques are well known to those skilled in the art.

The reaction of Method C may also be carried in a high pressure reactor.

Method C is usually most valuable when the aryl halide is activated by suitable electron-withdrawing groups on the ring, as is well known to the art. Suitable aryl halides for use in Method C are well known to the art, as are salts of perfluoroalkanesulfonamides.

Suitable perfluoroalkanesulfonyl anhydrides and halides (e.g. chlorides and fluorides) for use in these procedures are known to the art (thus see U.S. Pat. 2,732,398). Similarly, the amines used in producing the compounds of this invention are described in the general chemical literature or are otherwise known to those skilled in the art.

The following examples are given for the purpose of further illustrating the procedures of the present invention, but are not intended, in any way, to be limiting on the scope thereof. Thus while the majority of the examples relate to perfluoromethanesulfonamides, other perfluorocarbon groups can be substituted in place thereof.

Also, although the examples relate for the most part to compounds in the acid form (that is having a hydrogen atom bonded to the sulfonamido nitrogen), it is understood that the corresponding salts of the invention are also easily prepared and are likewise contemplated. Such salts, which have a cation bonded to the sulfonamide nitrogen, are also useful as herbicides, and in some cases as plant growth modifiers. Method A was used in preparing the compounds of the following examples unless otherwise specifically noted.

EXAMPLE 1

2-amino-9-fluorenone (20 g., 0.102 mole), triethylamine (16.7 ml., 0.113 mole) and chloroform (200 ml.) are stirred while adding trifluoromethanesulfonic anhydride (19.3 ml., 0.113 mole) and while maintaining the temperature below 10° C. After stirring three additional hours, the mixture is poured into water (400 ml.). The water layer is extracted five times with chloroform (total of 850 ml.). The chloroform layers are combined and evaporated in vacuo. The solid residue is taken up in 10 percent sodium hydroxide solution (700 ml.) and this solution is extracted three times with dichloromethane (total 800 ml.). The water layer is acidified with concentrated hydrochloric acid and the product collected by filtration. Recrystallization from ethanol-water gives 2 - trifluoromethylsulfonamido - 9 - fluorenone, M.P. 177.3–178.3° C.

*Analysis.*—Calculated for $C_{14}H_8F_3NO_3S$ (percent): C, 51.4; H, 2.5. Found (percent): C, 50.9; H, 2.4.

In order to prepare the cycloalkanoyltrifluoromethanesulfonanilides of the invention, as exemplified below, the appropriate cycloalkanoyl chlorides are reacted with benzene in a Friedel-Crafts reaction, the product ketones are nitrated with a mixture of nitric and acetic acids, the product mixtures are reduced with iron and acetic acid to give a mixture of cycloalkanoylanilines and these mixtures are reacted with trifluoromethanesulfonic anhydride according to Method A. The ortho and meta isomers are then separated by elution chromatography on silica gel. Their structures are established through proton magnetic resonance spectral analysis, infrared spectral analysis and elemental analysis.

EXAMPLE 2

Aluminum chloride (26.7 g., 0.20 mole) and benzene (150 ml.) are stirred while a mixture of cyclopentanoyl chloride (26.5 g., 0.20 mole) and benzene (150 ml.) are added dropwise over a period of one hour. The mixture is then stirred with excess 5 percent hydrochloric acid and ice for two hours. The layers are separated and the benzene layer is washed with sodium carbonate solution, water and saturated sodium chloride solution and dried. The benzene is removed in vacuo to give phenylcyclopentylketone.

Phenylcyclopentylketone (48 g., 0.26 mole) in glacial acetic acid (5.5 ml.) is added dropwise with stirring to cold (0 to −5° C.) 90 percent nitric acid (195 ml.) while maintaining the temperature below 0° C. The mixture is then poured over ice, and extracted with diethyl ether. The ether extracts are washed with sodium carbonate solution until basic, then washed with water and saturated sodium chloride solution and dried over magnesium sulfate. The ether is removed in vacuo to give a mixture of ortho- and meta-cyclopentanoylnitrobenzene.

A mixture of ortho- and meta-cyclopentanoylnitrobenzene (52 g., 0.23 mole) is dissolved in glacial acetic acid (450 ml.) at 90° C. Iron powder (64.4 g., 1.15 mole) is added in portions while maintaining the temperature below 90° C. After adding the first portion of iron, water (100 ml.) is added. The reaction mixture is heated at 90° C. for one hour after completion of the addition of iron, diluted with water and extracted with diethyl ether. The ether extracts are washed with sodium carbonate solution, water and saturated sodium chloride solution, dried over magnesium sulfate and the ether is removed in vacuo to give a mixture of ortho- and meta-cyclopentanoylaniline.

A mixture of ortho- and meta-cyclopentanoylaniline (12 g., 0.06 mole), N,N-dimethylaniline (8.0 g., 0.66 mole) and chloroform (100 ml.) is stirred while adding dropwise trifluoromethanesulfonic anhydride (16.9 g., 0.06 mole) at 25 to 30° C. The reaction mixture is stirred for two hours, washed with 5 percent hydrochloric acid and evaporated in vacuo to remove volatile impurities. The residue is dissolved in 5 percent sodium hydroxide solution and this solution washed with dichloromethane. The solution is then heated on a steam bath, treated with decolorizing charcoal and acidified with hydrochloric acid. The product is extracted into dichloromethane, dried and reisolated by evaporation. The ortho and meta isomers are separated by elution chromatography on silica gel, the clear liquid ortho isomer eluting rapidly with benzene while the solid meta isomer elutes more slowly with 90/10 benzene/ethanol.

Analysis for 2 - cyclopentanoyltrifluoromethanesulfonanilide.

Calculated for $C_{13}H_{14}F_3NO_3S$ (percent): C, 48.6; H, 4.4; N, 4.4. Found (percent): C, 48.5; H, 4.5; N, 4.3.

Analysis for 3 - cyclopentanoyltrifluoromethanesulfonanilide, M.P. 104–106° C.

Calculated for $C_{13}H_{14}F_3NO_3S$ (percent): C, 48.6; H, 4.4; N, 4.4. Found (percent): C, 49.0; H, 4.6; N, 4.3.

| Example number | Compound | M.P., ° C. |
|---|---|---|
| 3 | 3-cyclobutanoyltrifluoromethanesulfonanilide | 104–106 |
| 4 | 2-cyclobutanoyltrifluoromethanesulfonanilide | 44–45 |
| 5 | 2-cyclohexanoyltrifluoromethanesulfonanilide | 48–49 |
| 6 | 3-cyclohexanoyltrifluoromethanesulfonanilide | 155–157 |
| 7 | N-(1-naphthyl)-2-trifluoromethylsulfonamidobenzamide | 170–172 |
| 8 | 1-bromo-4-trifluoromethylsulfonamidonaphthalene | 134–136 |
| 9 | 2-trifluoromethylsulfonamidoanthroquinone | 257–259 |

EXAMPLE 10

1-bromo - 4 - trifluoromethylsulfonamidonaphthalene (3.54 g., 0.01 mole), triethylamine (1.01 g., 0.01 mole) and chloroform (25 ml.) are stirred for one hour at room temperature. The solvent is removed in vacuo. The solid product, triethylammonium 1-bromo-4-trifluoromethylsulfonamidonaphthalene is recrystallized from a benzenehexane mixture.

EXAMPLE 11

2-cyclohexanoyltrifluoromethanesulfonanilide (3.35 g., 0.01 mole), sodium bicarbonate (1.06 g., 0.01 mole) and water (10 ml.) are heated on a steam bath for one hour. The water is removed in vacuo. The solid product, sodium 2-cyclohexanoyltrifluoromethanesulfonanilide, is recrystallized from a methanolhexane mixture.

EXAMPLE 12

1-amino-4-bromonaphthalene (4.44 g., 0.02 mole), triethylamine (2.2 g., 0.022 mole) and perfluoro-n-butanesulfonyl fluoride (6.6 g., 0.022 mole) are placed in a Parr pressure vessel and heated at 50° C. for 20 hours. The volatile portion is removed in vacuo and the residue dissolved in dichloromethane, then extracted with aqueous sodium hydroxide. The aqueous layer is then acidified with aqueous hydrochloric acid to give the solid product, 1-bromo - 4 - perfluoro-n-butanesulfonamidonaphthalene which is recrystallized from a benzenehexane mixture.

What is claimed is:

1. A compound of the formula

and metal, ammonium and organic amine salts thereof wherein $R_f$ is a perfluoroalkyl group containing one to four carbon atoms and Ar is selected from cycloalkanoylphenyl containing not more than 20 carbon atoms, naphthyl, anthraquinonyl, fluorenonyl, and N-(naphthyl)carbamylphenyl.

2. A compound according to claim 1 in which $R_f$ is $CF_3$.

3. A compound according to claim 1 in which Ar is cycloalkanoylphenyl.

4. 2 - cyclohexanoyltrifluoromethanesulfonanilide according to claim 3.

5. The compound 1 - bromo-4-trifluoromethylsulfonamidonaphthalene.

References Cited

UNITED STATES PATENTS 3,458,571   7/1969   Tokoli _____ 260—556

HENRY R. JILES, Primary Examiner

C. M. SHURKO, Assistant Examiner

U.S. Cl. X.R.

71—103; 260—371